United States Patent [19]
Nishimoto

[11] Patent Number: 5,499,732
[45] Date of Patent: Mar. 19, 1996

[54] METHOD FOR FABRICATING AN OPTICAL DEVICE

[75] Inventor: Hiroshi Nishimoto, Tokyo, Japan

[73] Assignee: NEC Corporation, Tokyo, Japan

[21] Appl. No.: 257,694

[22] Filed: Jun. 6, 1994

[30] Foreign Application Priority Data

Jun. 8, 1993 [JP] Japan ..................... 5-136351

[51] Int. Cl.$^6$ ..................................................... B29D 11/00
[52] U.S. Cl. ................... 216/24; 216/41; 216/59; 216/79; 156/633.1; 156/657.1; 156/659.11
[58] Field of Search ..................... 156/633, 634, 156/647, 656, 657, 659.1, 901, 902, 643, 633.1, 656.1, 657.1, 659.11, 643.1; 216/2, 17, 20, 24, 33, 39, 41, 51, 59, 79, 99; 385/14, 89, 91

[56] References Cited

U.S. PATENT DOCUMENTS 4,732,646  3/1988  Elsner et al. ..................... 156/626
5,268,066  12/1993  Tabasky et al. ..................... 156/659.1 X

OTHER PUBLICATIONS

"Glass Waveguides on Silicon for Hybrid Optical Packaging", *IEEE Journal of lightwave technology*, vol. 7, No. 10, Oct. 1989, by C. H. Henry et al., pp. 1530–1539.
"Electronics Letters", vol. 22 No. 12, Jun. 5, 1986, pp. 642–644.

*Primary Examiner*—William Powell
*Attorney, Agent, or Firm*—Young & Thompson

[57] ABSTRACT

An etching pattern for forming a groove to be mounted by an optical fiber, marks for positioning an optical semiconductor laser, a semiconductor photodetector, and an optical multiplexing and demultiplexing device, marks for aligning device, marks for aligning optical waveguides to the laser, the photodetector, and the multiplexing an demultiplexing device, and electric interconnections and pads for an electronic semiconductor device and the above described optical parts are defined on a semiconductor substrate prior to the formation of the optical waveguides.

6 Claims, 3 Drawing Sheets

METHOD FOR FABRICATING AN OPTICAL DEVICE

FIELD OF THE INVENTION

The invention relates to a method for fabricating an optical device, and more particularly, to a fabrication method for an optical device in which optical part such as an optical fiber, optical semiconductor devices, etc. and optical waveguides are formed on a substrate.

BACKGROUND OF THE INVENTION

An optical communication system has been promoted to be large in communication capacity and to have as many highly advanced functions as possible. On the other hand, an optical fiber network system has been required to be small in size, low in cost, and high in integration degree. Among these tendencies, it will inevitable that an optical device such as an optical transmitter, an optical receiver, etc. is required to be small in size, low in cost, and high in integration degree. In various optical devices now used practically, a spatial connection using a lens, etc. defined "microoptics" is used to connect an optical fiber to optical parts such as a semiconductor light source, an optical semiconductor detector, an optical demultiplexer, etc. The microoptics structure is difficult to be small in size, because there is limitation in size in regards to the configuration of a lens; and packages for semiconductor light source, an optical semiconductor detector, and so on. In order to effectively couple a light propagating through air space to an optical fiber and an optical detector, it is required to adjust the axial alignment of light with high precision. In this adjustment of the light axial alignment, much labor is required to be high in cost. For this reason, the microoptics structure is not appropriate to be used for high integration of devices having the same and different functions.

In these days, the necessity of optical bidirectional communication systems has been increased, and it has ben required that these systems are introduced into individual homes. In such an optical bidirectional communication system, an optical transmitter and an optical receiver are used. If such optical devices are used as discrete parts, an optical transmission and receiving apparatus becomes large in size to hinder the propagation of these systems.

In such a situation, a proposal in which an optical waveguide is used for the purpose of small size, high integration, and low cost in place of the microoptics structure is described on pages 1530 to 1539 of "IEEE Lightwave technology, 1989".

One type of an optical device using optical waveguides comprises an optical multiplexer and demultiplexer formed on a substrate. In the optical device, the optical multiplexer and demultiplexer is connected via optical waveguides to a semiconductor light source and semiconductor photodetectors which are also mounted on the substrate, and the semiconductor light detectors are connected via electric interconnections to electronic semiconductor devices. Further, one or some of the optical waveguides are directly coupled to an optical fiber for propagating lights between the optical device and another optical device.

In the optical device, the light source emits a light modulated by a transmitting signal, and the light is supplied via the optical multiplexer and demultiplexer to the optical fiber, through which the light is transmitted to the other optical device. On the other hand, the optical multiplexer and demultiplexer receives a light transmitted from the other optical device by the optical fiber, and demultiplexes the light to be supplied to the optical detectors, from which electric signals are supplied to the electronic devices. Thus, the processing of the electric signals are carried out.

In the optical device, however, there is a disadvantage in that an optical coupling of high efficiency between of the optical parts and a corresponding one of the optical waveguides is difficult to be obtained, because the light axial alignment is required to be adjusted with a precision of approximately 1μm in the three dimensional (X, Y and Z) directions.

SUMMARY OF THE INVENTION

Accordingly, it is an object of the invention to provide a method for fabricating an optical device in which the light axial alignment is adjusted with as a high precision as required in the three dimensional directions.

It is a further object of the invention to provide a method for fabricating an optical device in which the whole fabrication steps are substantially carried out on a substrate.

It is a still further object of the invention to provide a method for fabricating an optical devices, by which an optical devices are fabricated with mass-production and low cost.

According to the invention, a method for fabricating optical device, comprises the steps of:

providing a semiconductor substrate having a flat main surface;

defining marks for positioning optical parts, marks for aligning light axes of optical waveguide to the optical parts, a mask pattern for etching a groove to be mounted with an optical fiber, and electric interconnections and electric pads to be connected to the optical parts and an electronic device, respectively, on the flat main surface of the semiconductor substrate;

providing the optical waveguides in accordance with the aligning marks on the flat main surface of the semiconductor substrate;

forming the groove for the optical fiber in accordance with the etching pattern on the flat main surface of the semiconductor substrate;

mounting the optical fiber into the groove to optically couple with a corresponding one of optical waveguides;

mounting the optical part on the flat main surface of the silicon substrate in accordance with the aligning marks to be optically coupled to the optical waveguides; and connecting the optical parts and the electronics device electrically to the electric interconnections and the electric pads.

BRIEF DESCRIPTION OF THE DRAWINGS

The invention will be explained in more detail in conjunction with appended drawings, wherein.

DESCRIPTION OF THE PREFERRED EMBODIMENT

Before explaining a method for fabricating an optical device in the preferred embodiment according to the invention, the aforementioned optical device will be explained.

Figure 1:
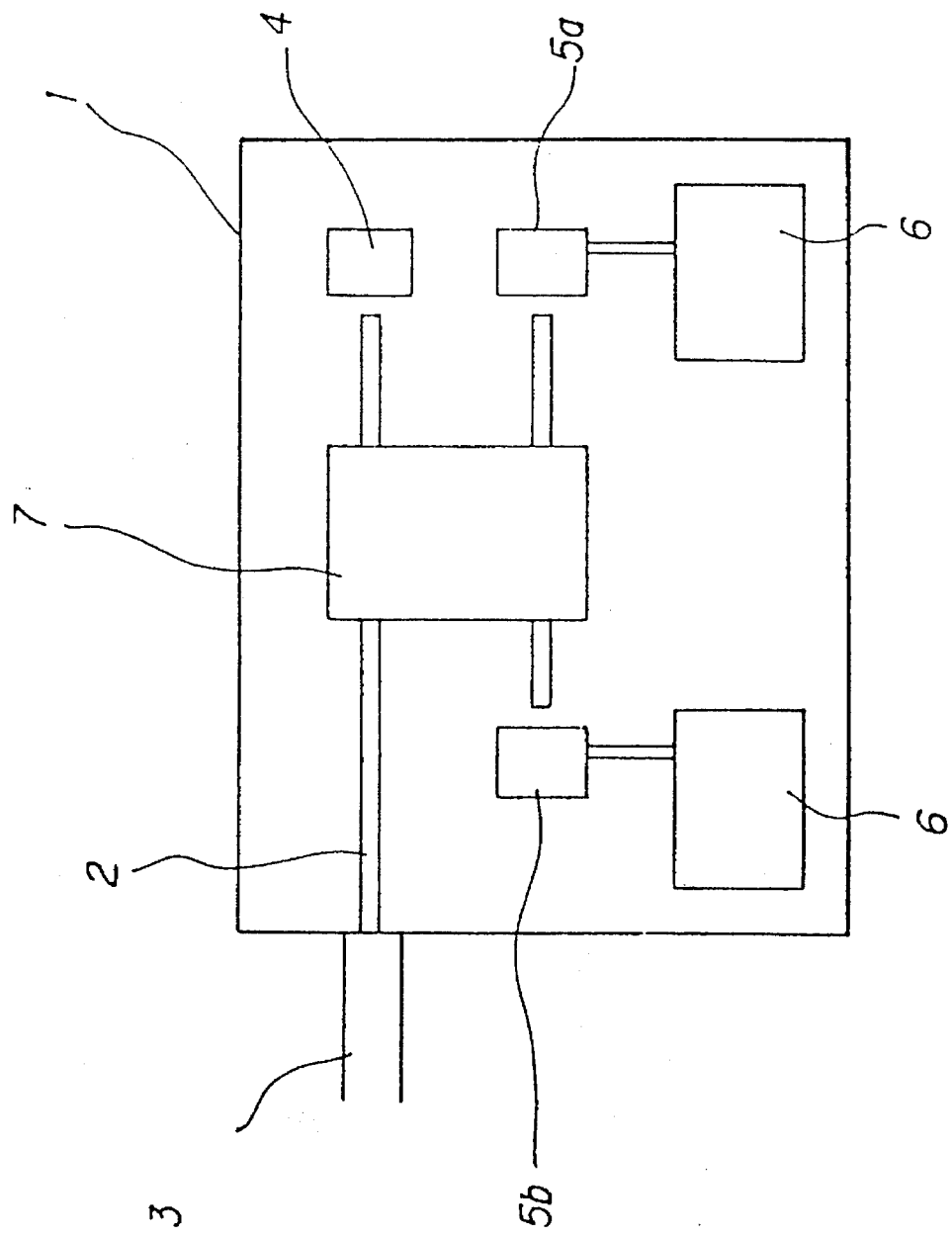
FIG. 1 is a plan view showing a conventional optical device.

FIG. 1 shows the optical device which comprises an optical multiplexer and demultiplexer 7 and optical waveguides 2, respectively, formed on a substrate 1. In this optical device, a semiconductor light source 4, semiconductor photodetectors 5a and 5b, and electronic semiconductor devices 6 are further formed on the substrate 1. The optical multiplexer and demultiplexer 7 is directly coupled to the semiconductor light source 4, the semiconductor photodetector 5a and 5b, and an optical fiber 3 by the optical waveguides 2, and the semiconductor photodetectors 5a and 5b are connected to the electronic semiconductor devices 6 by electric interconnections 6a. Operation of the optical device is explained in the background of the invention. Therefore, it will not be explained here.

Next, a method for fabricating an optical device in the preferred embodiment according to the invention will be explained in FIGS. 2A to 2E.

Figure 2A:
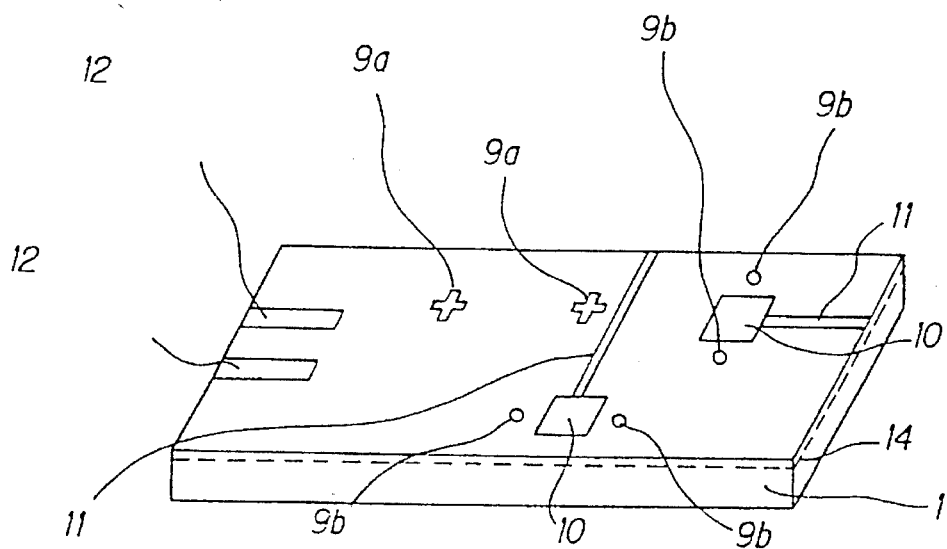
FIGS. 2A to 2E are schematic prospective views showing the steps in a method for fabricating an optical device in a preferred embodiment according to the invention.

In FIG. 2A, position alignment marks 9a for aligning light axes of optical waveguides formed on a silicon substrate 1 to those of optical fibers and optical semiconductor devices mounted on the substrate 1, marks 9b for representing mounting positions of the optical semiconductor devices, electrode pads 10 for electric contact of the optical semiconductor device, electric interconnections for connecting the optical semiconductor devices to each other and/or to a power supply, and a mask pattern 12 for forming grooves to be mounted with the optical fibers are formed on the substrate 1 by predetermine position, configuration, dimension, and thickness. In this formation, lithography method and dry-etching method such as reactive ion etching (RIE) method, ion beam etching method, reactive ion beam etching (RIBE) method, etc. or wet etching method using chemical materials are used to provide the above described marks, patterns, etc.

The formation precision of position, configuration and dimension is easily obtained to be 0.1μm which is a limitation in the lithography method. For the above described pattern one or some metals selected from Cr, Pt, Au, WSi, W, Ni, Mo, etc. are used to be several thousands Å to 1μm approximately dependent on performances required. Therefore, when different metals are used for different patterns, the lithography method and the growth of films are repeated at times of forming the patterns. At this step, an insulating layer 14 may be formed on the substrate 1 by thermal oxidation method, sputtering method, or CVD method, when the electric interconnections 11 are formed thereon.

Figure 2B:
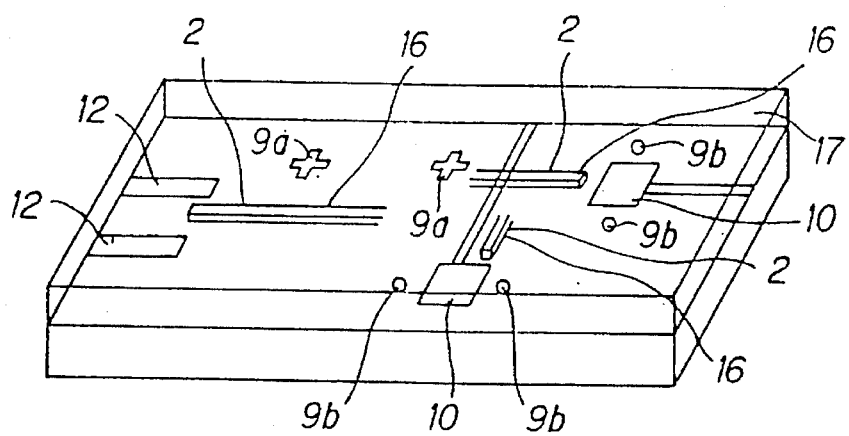

In FIG. 2B, a silica film 17 is formed on the silicon substrate 1 by the CVD method, and the optical waveguides 2 each comprising a clad layer, a core layer 16, and a clad layer are formed by the lithograph method and dry etching method or the wet etching method, as explained in FIG. 2A. The clad layers and the core layer 16 are of silica-based materials, and of approximately 25μm in total thickness. When the core layer 16 is patterned, the pattern alignment is carried out by using the marks 9a, so that a pattern precision is obtained to be as high as 0.1 μm which is the limitation of the lithography method.

Figure 2C:
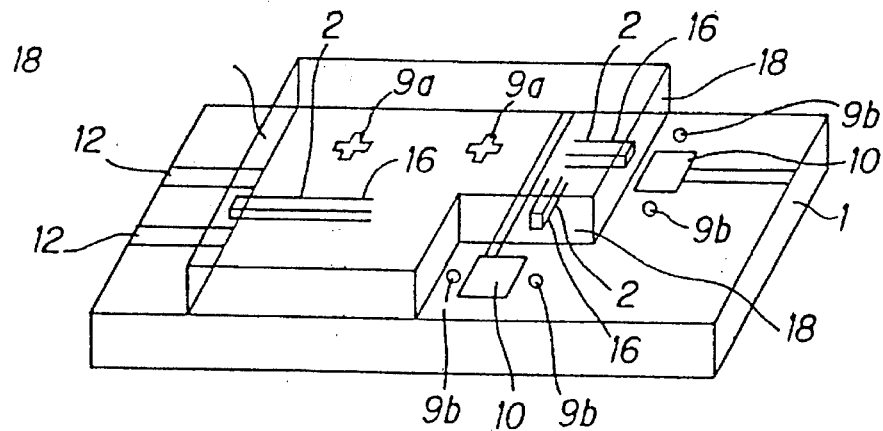

In FIG. 2C, end planes of the silica film 17 are defined to be coplanar with the ends of the optical waveguides 2 by the lithography method and the dry etching method or the wet etching method, as explained in FIG. 2A. Consequently, the marks 9a and 9b, the electrode pads 10, the electric interconnections 11, and the groove mask pattern 12 are exposed on the silicon substrate.

Figure 2D:
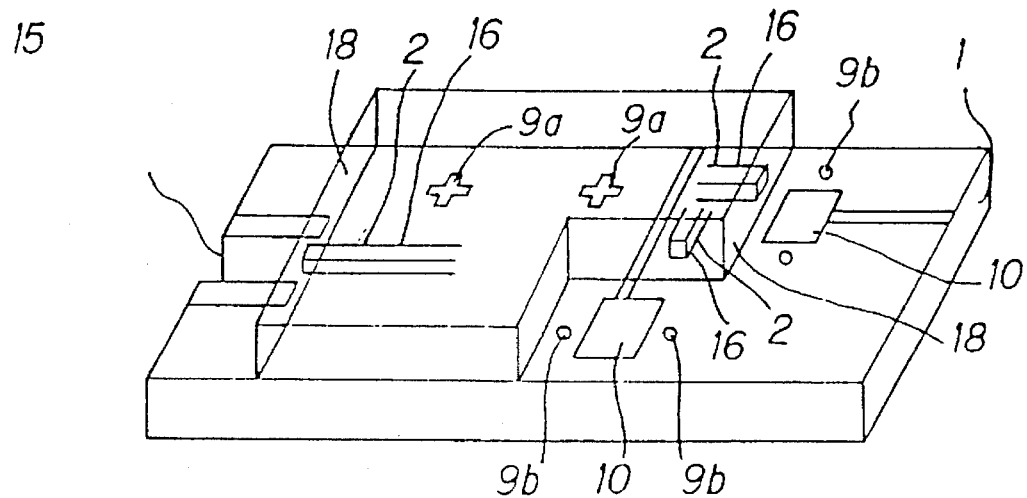

In FIG. 2D, a V-groove 15 to be mounted with an optical fiber is formed in accordance with the anisotropic wet etching on the silicon substrate 1 by using the chemical materials such as KOH, hydrazine, etc. At this step, KOH is used for the purpose, WSi, W, Cr, Au, SiO₂ or Al is used for the mask pattern 12, because all of them are anti-corrosive to KOH. Especially, WSi, W, Cr, Au and Al are useful for the masks 9a and 9b, the electrode pads 10, and the electric interconnections 11 adapted to flow low to high speed signals. For this reason, if a material is adequately selected at the step in FIG. 2, the step in FIG. 2A, the growth of films and the lithography method are carried out only one time, respectively. In another aspect, WSi, W, Cr and Au are durable to thermal treatment at approximately 850° C. to be applied to wide applications.

Figure 2E:
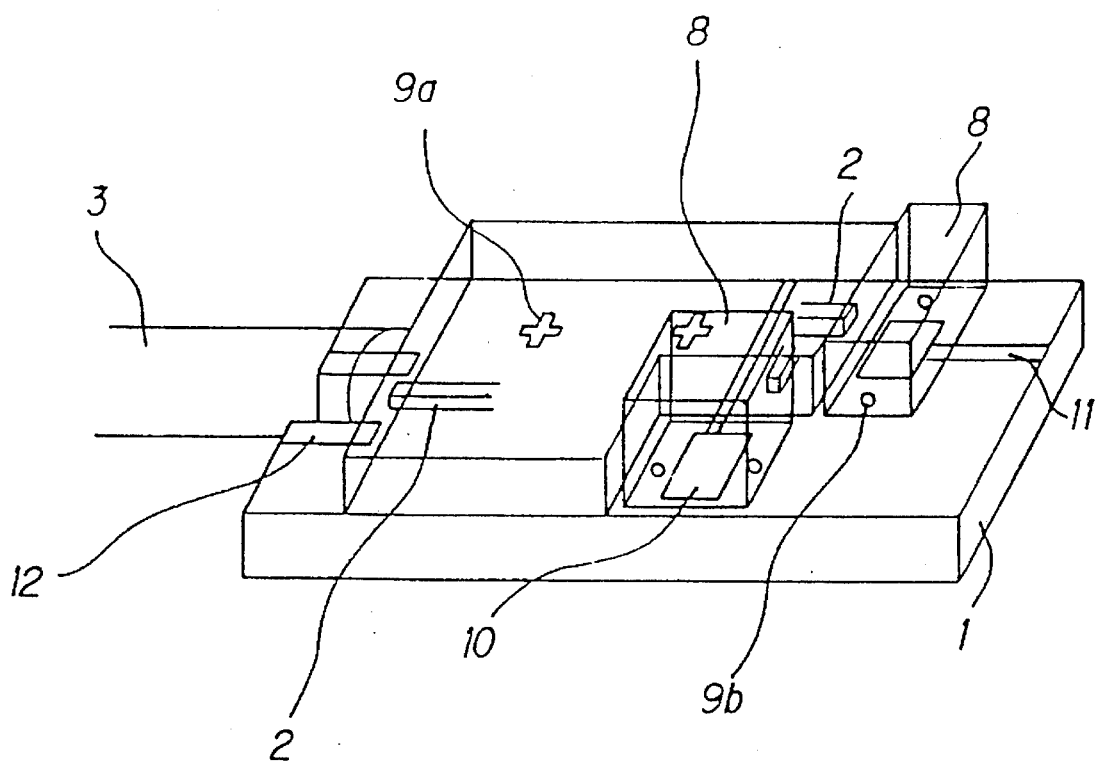

In FIG. 2E, the optical semiconductor devices are mounted by using the marks 9b and the electrode pads 10, and an optical fiber 3 is mounted in the V-groove 15. Thus, an optical device having a light axial alignment precision of 0.1 μm in the three dimensional directions is completed. At this step, the pattern sensing technology and the chip mounting technology are adopted to mount the optical semiconductor devices 8 on the silicon substrate 1 by using the marks 9b. In addition, solder bumps of AuSn, PbSn or InP may be formed on the electrode pads 10, so that the self-alignment mount of the optical semiconductor devices 8 is possible to be carried out on the silicon substrate 1.

When the electric interconnections 11 and other patterns are not required to have high precision on position, configuration and dimension, and are not positioned immediately below the optical waveguides 2, they may be formed at a step between the steps in FIGS. 2D and 2E.

As explained above, no lithography method is carried out, after the end planes 18 of the silica film 17 and the V-groove 15 are formed, that is, step configurations are formed. In other words, all patterns, marks, etc. are defined on a flat semiconductor substrate 1, so that all lithography processes are carried out on the flat semiconductor substrate. Therefore, the precision of 0.1 μm in the lithography method is directly used as a precision of an optical device fabricated in the invention. Further, the electric interconnections 11 can be patterned without any influence of the lay-out of the optical waveguides 2. This results in the increase of freedom in design for the optical device in the invention.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. A method for fabricating an optical device, comprising the steps of:

providing a semiconductor substrate having a flat main surface;

defining marks for positioning optical parts, marks for aligning light axes of optical waveguide to said optical parts, a mask pattern for etching a groove to be mounted with an optical fiber, and electric interconnections and electric pads to be connected to said optical parts and an electronic device, respectively, on said flat main surface of said semiconductor substrate;

providing said optical waveguides in accordance with said aligning marks on said flat main surface of said semiconductor substrate;

forming said groove for said optical fiber in accordance with said etching pattern on said flat main surface of said semiconductor substrate;

mounting said optical fiber into said groove to optically couple with a corresponding one of optical waveguides;

mounting said optical part on said flat main surface of said substrate in accordance with said aligning marks to be optically coupled to said optical waveguides; and connecting said optical parts and said electronics device electrically to said electric interconnections and said electric pads.

2. A method for fabricating an optical device, according to claim 1, wherein:

said step of providing said optical waveguides, comprises:

forming an insulating film on said flat main surface of said semiconductor surface;

forming a silica film on said insulating film; and defining core layers each sandwiched between clad layers in a thick direction of said silica film in accordance with said aligning marks, a refractive index of said core layers being higher than that of said clad layers.

3. A method for fabricating an optical device, according to claim 1, wherein:

said step of mounting said optical parts, comprises:

mounting a semiconductor light source, a semiconductor photodetector, and an optical multiplexing and demultiplexing device on said flat main surface of said semiconductor substrate.

4. A method for fabricating an optical device, according to claim 2, wherein:

said step of defining said core layers, comprises:

etching said core layers and said clad layers on side walls of etched silica film.

5. A method for fabricating an optical device, according to claim 4, wherein:

said step of etching said silica film is carried out prior to said step of forming said groove.

6. A method for fabricating an optical device, according to claim 1, wherein:

said step of forming said groove provides a V-groove by anisotoropic etching of said semiconductor substrate.

* * * * *